United States Patent [19]
Pace

[11] 3,752,599
[45] Aug. 14, 1973

[54] BUCKET VIBRATION DAMPING DEVICE

[75] Inventor: Edwin L. Pace, South Ashburnham, Mass.

[73] Assignee: General Electric Company, Schenectady, N.Y.

[22] Filed: Mar. 29, 1971

[21] Appl. No.: 128,761

[52] U.S. Cl. ................. 416/190, 416/191, 416/500, 416/196
[51] Int. Cl. .............................................. F01d 5/16
[58] Field of Search .................... 416/190, 191, 500, 416/221, 196

[56] References Cited
UNITED STATES PATENTS

| | | | |
|---|---|---|---|
| 2,349,187 | 5/1944 | Meyer | 416/190 |
| 1,554,614 | 9/1925 | Allen | 416/190 |
| 2,310,412 | 2/1943 | Flanders | 416/190 |
| 2,942,843 | 6/1960 | Sampson | 416/190 |
| 3,396,905 | 8/1968 | Johnson | 416/190 X |
| 3,084,343 | 4/1963 | Rubio et al. | 416/215 |
| 3,292,900 | 12/1966 | Pettersen | 416/218 |

FOREIGN PATENTS OR APPLICATIONS

| | | | |
|---|---|---|---|
| 1,426,798 | 3/1969 | Germany | 416/190 |
| 128,868 | 10/1959 | U.S.S.R. | 416/500 |

*Primary Examiner*—Everette A. Powell, Jr.
*Attorney*—William C. Crutcher, James W. Mitchell, Frank L. Neuhauser, Oscar B. Waddell and Joseph B. Forman

[57] ABSTRACT

A bucket vibration damping device for a turbomachine including a composite button disposed between relatively vibratory, closely adjacent blade parts in a cutout having opposite portions formed in the closely adjacent opposing edge surfaces of the blade parts. When the turbo machine is operating, centrifugal forces thrust the button radially outward within the cutout so that the button will frictionally engage the adjacent blade parts to minimize relative vibrational movement. The geometry of the button is such that it tends to provide equal frictional forces on each blade part.

1 Claim, 4 Drawing Figures

Patented Aug. 14, 1973

INVENTOR:
EDWIN L. PACE,
BY James W Mitchell
HIS ATTORNEY.

Patented Aug. 14, 1973

INVENTOR:
EDWIN L. PACE,

BY James W. Mitchell
HIS ATTORNEY.

BUCKET VIBRATION DAMPING DEVICE

BACKGROUND OF THE INVENTION

One present limiting factor in the design of turbo machinery is the stresses arising from vibration in the buckets or blades. If a means can be found to reduce these vibratory stresses, it will be possible to build turbo machinery which will operate at higher speeds and higher horsepowers than are now possible.

Several different damping devices which seek to minimize vibratory stresses are known in the prior art. One such device includes a continuous wire spanning several bucket portions. Another such device shows loose axial pins mounted in the dovetail or in the shroud areas to dampen vibration. Another device discloses longitudinally mounted pins or springs extending radially into the buckets or blades.

All of the above devices have resulted in some decrease in the vibrational stresses in the blades but with the advantages they have brought disadvantages such as inefficient wear characteristics upon both the blade and the damping device or generally ineffective damping characteristics.

OBJECTS OF THE INVENTION

Accordingly, it is an object of this invention to provide a bucket vibration damping device which will effect an equal, balanced, damping effect on the turbine buckets.

Another object of this invention is to provide a bucket vibration damping device which will wear evenly during its useful life so that a maximum damping effect will be realized.

Another object of this invention to provide a bucket vibration damping device which will allow for slight misalignment of the turbine buckets.

Other objects, advantages and features of the present invention will become apparent from the following detailed description of an embodiment thereof taken in connection with the accompanying drawing.

SUMMARY OF THE INVENTION

Briefly stated, the present invention is practiced by inserting a composite button damping device into a similarly shaped but somewhat larger cutout defined by two opposite cutout portions formed in closely adjacent opposing bucket edge surfaces. The composite button is thrust radially outwardly by centrifugal forces so that it frictionally engages adjacent blade parts providing equal frictional forces on each blade part to dampen the vibratory motion.

DETAILED DESCRIPTION OF THE INVENTION

Figure 1:
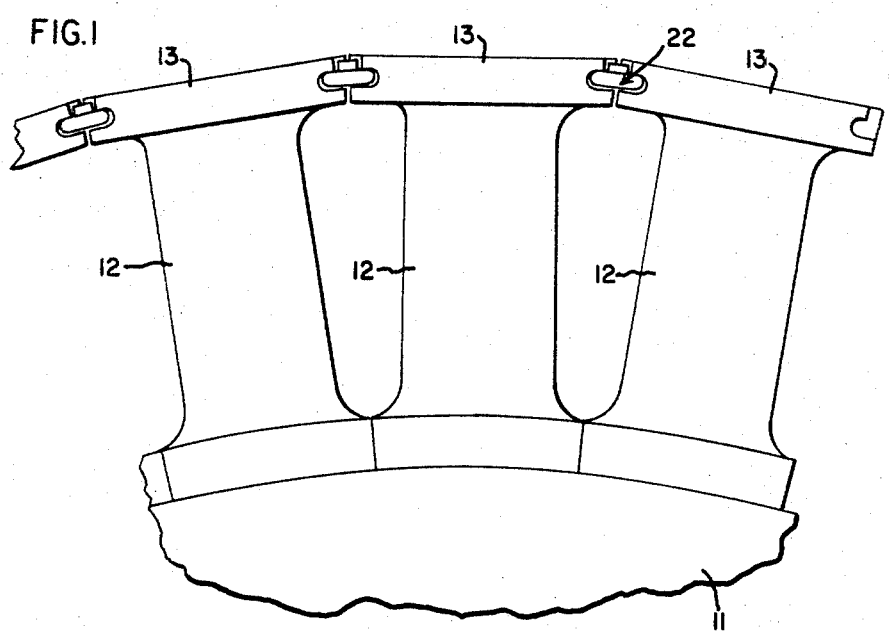
FIG. 1 is an elevational view of a section of a turbine rotor with buckets and bucket covers attached thereto, showing the present invention as applied to bucket covers.
Figure 2:
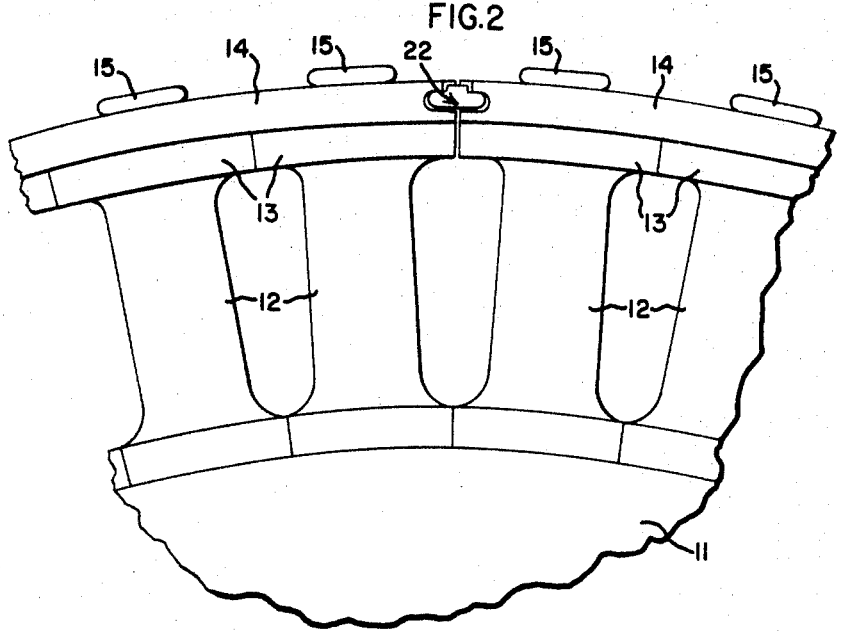
FIG. 2 is a view similar to FIG. 1 showing a section of a turbine rotor with buckets, bucket covers and shroud bands with the present invention applied to the shroud bands.

Referring to FIG. 1, a typical environment of this invention is illustrated, showing a turbine rotor 11 of a rotating turbine machine. The rotor has a plurality of buckets or blades 12 fixed about the circumference of the rotor. Bucket covers 13 may be integral with the blades or buckets. As shown in FIG. 2, a shroud band 14 may extend over several buckets and the shroud band is held to the bucket covers by fasteners 15. It should be understood that the blade part construction as shown in FIGS. 1 and 2 is merely illustrative and that any combination of buckets, bucket covers and shroud bands may be used.

Figure 3:
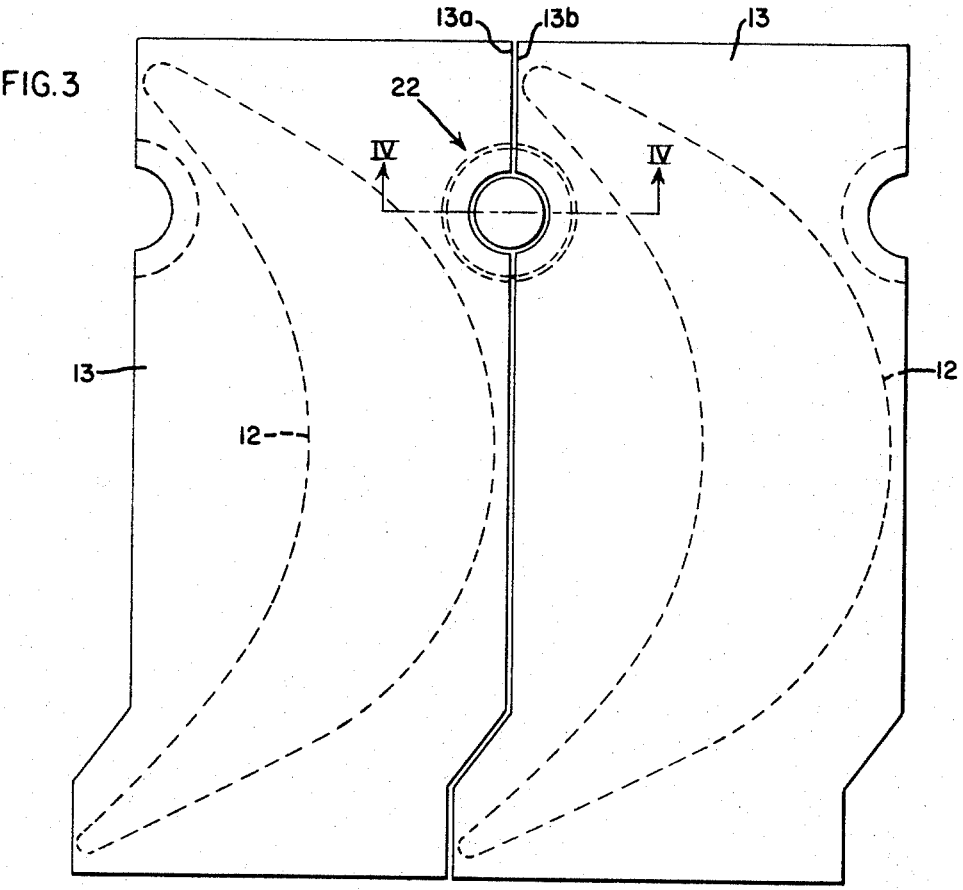
FIG. 3 is a plan view of the turbine buckets without the shroud bands and having the present invention applied to the bucket covers.
Figure 4:
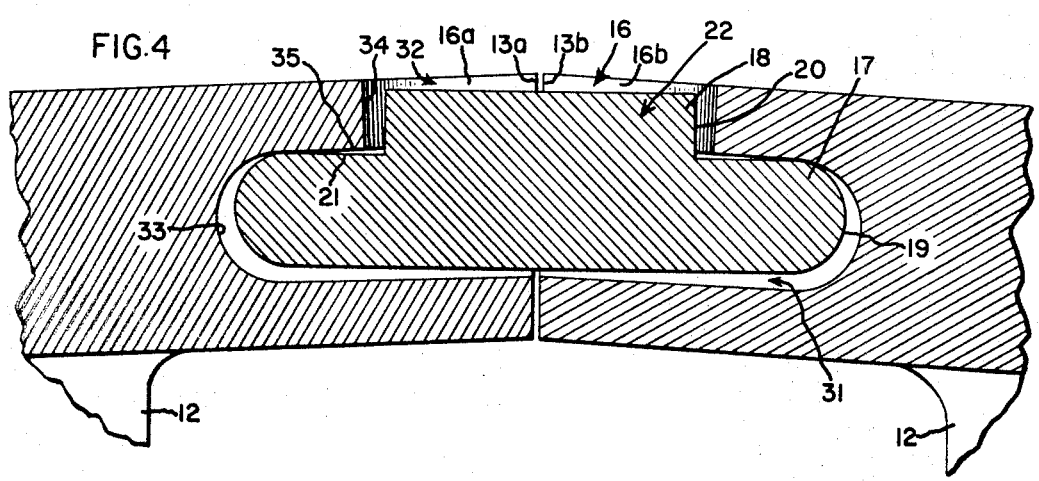
FIG. 4 is an elevation taken along IV—IV of FIG. 3 and somewhat enlarged.

One typical construction as shown in FIGS. 1, 3 and 4 includes buckets 12 having integral bucket covers 13. These integral bucket covers have opposing, closely adjacent edge surfaces 13a and 13b. The bucket vibration damping device referred to generally at 22 is mounted in a cutout 16, generally referred to, defined by two opposite cutout portions 16a and 16b formed in the two closely adjacent edge surfaces of the integral bucket covers. The bucket vibration damping device or composite button 22 is formed with a body portion 17 and a crown portion 18. The composite button 22 is symmetrical about an axis which is orientated more or less in a radial direction away from the rotor axis. Viewed from the top of the damping device, the composite button takes the appearance of two concentric circles. The body portion is circular and of a relatively large diameter having an outwardly rounded external circumference 19. The crown portion is circular and of a relatively small diameter having a flattened external circumference 20. The composite button has an upper frictional damping surface 21. The crown portion of the button serves two functions. It limits the motion of the button in a direction perpendicular to the axis of the button and it increases the weight and therefore the damping force of the button.

The cutout 16 is similar in shape to the composite button, but it is larger than the button. The cutout may be formed between adjacent bucket covers, adjacent shroud bands, or both; or between adjacent shroud bands without bucket covers. The base portion 31 of the cutout is formed with a relatively large diameter, while the crown portion 32 of the cutout is formed with a relatively smaller diameter. The base portion of the cutout is formed with an outwardly rounded circumference 33, while the crown portion has a flattened external circumference 34.

As was previously mentioned, the cutout portion is larger than the damping device so that the damping device may move horizontally, radially outwardly, and rotate about its own vertical axis. This arrangement allows some normal operational misalignment between adjacent blade parts. The cutout portion has an upper frictional damping surface 35 for contacting the frictional damping surface 21 of the composite button when the turbine is in operation. When the composite button is inserted into the cutout, the cutout encloses and holds the button in place.

The operation of the bucket vibration damping device is as follows. As the turbine rotor rotates, vibratory stresses are introduced into the turbine blade parts. These turbine blade parts may include, among others, turbine buckets with integral covers, turbine buckets having integral covers and shroud bands, or turbine buckets without integral covers but having shroud bands. The particular blade part construction depends upon the design requirements of the turbine.

When the turbo-machine is up to speed, adjacent turbine blade parts tend to vibrate relatively to one another. The turbine bucket damping device or composite button minimizes this vibration by applying frictional forces equally to adjacent turbine blade parts. Centrifugal forces due to rotation of the turbine rotor, tend to drive the turbine bucket damping device or composite button radially outwardly against the adjacent turbine blade parts so that the frictional damping surfaces 21 and 35 of the composite button and the cutout frictionally engage thereby limiting relative vibration between adjacent blade parts.

The diameter of the composite button is relatively large with respect to its thickness, a suitable ratio being approximately 3 or 4 to 1. The geometry of the composite button and the similarity of the cutout to the composite button causes the button to align itself equally on both sides of the cutout, thus causing the button to be self-centering. The crown 18 of the button limits the right or left drift of the pin, and so the button being approximately centered causes equal frictional forces to bear upon each opposite portion of the cutout, and thereby balances the effect of the button on the adjacent blade parts.

The base portion of the button being rounded outwardly, circumferentially, provides a greater contact bearing surface because it decreases the tendency of the button to wear by increasing the effective bearing surface available as contrasted with a pointed bearing surface. This shape also increases the frictional damping effect by increasing the frictional damping surface.

Since the damping button is circular, the button may rotate about its own vertical axis, thereby tending to distribute wear evenly about the button.

Referring back to FIG. 2, an alternate embodiment to the embodiment shown in FIGS. 1, 3 and 4 is shown.

In the FIG. 2 embodiment, the composite button is placed between adjacent blade parts in the form of shroud bands 14.

Another modification of this invention (not shown) would be the insertion of a blade damping device into the adjacent blade parts between the dovetail portion and the rotor portion.

It should be apparent that the terms "buckets" and "blades" in this application have been used interchangeably. Further the term "adjacent blade parts" refers to buckets or blades with integral covers, or buckets or blades with integral covers and attached shroud bands, or any useful modified construction thereof.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. A bucket vibration damping device, for a turbo-machine rotor including a plurality of bucket parts circumferentially mounted about the turbine rotor, each bucket part being mounted adjacent another bucket part to provide closely adjacent opposing edge surfaces; each edge surface formed with a cutout portion and opposing cutout portions forming a cavity complementary to said bucket vibration damping device; said bucket vibration damping device comprising:

a composite button, including a body portion and a crown portion, inserted into each cavity formed in adjacent opposing edge surfaces; said body portion diameter greater than said crown portion diameter and said body portion having a rounded circumference; and, the composite button mounted with the crown portion radially outward from said body portion.

* * * * *